United States Patent Office 3,282,656
Patented Nov. 1, 1966

3,282,656
PREPARATION OF PLUTONIUM MONOSULFIDE AND PLUTONIUM MONOPHOSPHIDE
Owen L. Kruger, Westmont, John B. Moser, Evanston, and Bernard J. Wrona, Joliet, Ill., assignors to the United States of America as represented by the United States Atomic Energy Commission
No Drawing. Filed Mar. 26, 1965, Ser. No. 443,115
3 Claims. (Cl. 23—344)

The invention described herein was made in the course of, or under, a contract with the United States Atomic Energy Commission.

This invention relates to a process of preparing plutonium monosulfide or plutonium monophosphide by reaction of metallic plutonium with hydrogen sulfide or hydrogen phosphide (phosphine, $PH_3$).

Plutonium sulfide and plutonium phosphide are desirable nuclear fuel compounds because of their high melting points. Plutonium monosulfide, for instance, melts at 2330° C. There are two known plutonium sulfides, PuS and $Pu_2S_3$, while there is only one known plutonium phosphide, the monophosphide, PuP. Of the sulfides, the monosulfide is preferred as nuclear fuel, because it has the highest plutonium concentration.

The process that was the most logical for the production of the monocompounds was the one that had been successfully used for the production of uranium monosulfide. That process comprises repeatedly hydriding and dehydriding uranium metal at elevated temperature to obtain a powdery uranium material and reacting the uranium powder at elevated temperature with hydrogen sulfide or phosphine.

However, the process just outlined was found inoperative for the production of plutonium monosulfide and plutonium monophosphide, because the process of hydriding and dehydriding creates some problems, because pulverization of the plutonium does not occur. On dehydriding above 400° C., where evolution of hydrogen is rapid, fusion of the plutonium takes place, and a sintered mass of such great density is obtained that a reaction with hydrogen sulfide occurs on the surface only.

It is an object of this invention to provide a process for the production of plutonium monosulfide and plutonium monophosphide by which a complete conversion can be accomplished in a relatively short time.

It was found that, if plutonium powder or a plutonium hydride that has a lesser hydrogen content than corresponds to the compound $PuH_2$ is reacted with hydrogen sulfide in stages, if each stage is preceded by a dehydriding step and if each subsequent cycle of dehydriding and sulfidization is carried out at a higher temperature than the preceding one, the plutonium can be quantitatively converted to the monosulfide. In the various stages a gradual sulfiding takes place, starting with the formation of a relatively thin sulfide surface layer or coating and yielding a thicker coating with each additional cycle. Plutonium sesquisulfide is formed as a surface layer, and on homogenization under vacuum at high temperatures this layer reacts with plutonium at the center of the particle to produce PuS.

The sulfide coating formed in the first cycle or cycles prevents the coalescence of the particles by sintering, so that the plutonium and its hydride can then be sulfided completely at a higher temperature without fusion or sintering.

The situation is similar for the production of plutonium monophosphide with the exception that in this case plutonium monophosphide is always formed.

The process of this invention thus comprises reacting plutonium metal with hydrogen gas at between room temperature and 200° C., whereby plutonium hydride is formed; cooling the reaction product to room temperature and crushing it to powder; heating the crushed product to about 400° C. in a vacuum, whereby partial dehydriding takes place; reacting the partially dehyrided plutonium product with a reactant selected from the group consisting of hydrogen sulfide and hydrogen phosphide at 400° C., whereby the surface of the particles is converted to $Pu_2S_3$ or PuP; increasing the temperature of the product to about 500° C. while again applying a vacuum, whereby part of the $PuH_2$ is reduced to plutonium metal; reacting the product with said reactant at about 500° C. in vacuum, whereby the metallic plutonium is converted to $Pu_2S_3$ or PuP; bringing the temperature of the product to 600° C. and applying a vacuum, whereby some of the remaining $PuH_2$ is reduced to plutonium metal; and reacting the product at said temperature of 600° C. with said reactants, whereby the additional metallic plutonium is converted to $Pu_2S_3$ or PuP. In the case of the sulfide, the mixture of $Pu_2S_3$ and $PuH_2$ is then converted to plutonium monosulfide by vacuum-heating at about 1600° C. This step, which takes about four hours, at the same time homogenizes the product.

In the preparation of the plutonium phosphide, a final heat treatment at 1600° C. in vacuum as in the production of the sulfide is not necessary, because the monophosphide is obtained in all reaction steps with phosphine, if phosphidization is carried to completion in the last step. For the sake of homogenization, a heat treatment at about 1400° C., however, can be applied to the phosphide.

While for both, the sulfide and the phosphide, the temperature for the first dehydriding-reaction cycle is critical and must be carried out at 400±10° C., the temperatures for the second and subsequent cycle or cycles need not be adhered to as rigidly and can deviate from the temperatures of 500 and 600° C., respectively, more generously.

The final products of plutonium monosulfide or plutonium phosphide that are obtained in powder form by the process of this invention can then be pressed and sintered into any shape desired by processes known to those skilled in the art. For instance, the plutonium compounds can first be crushed to smaller particles; the latter can then be coated with a solution of an organic volatilizable binder, and the mixture thus obtained can be pressed into pellets, rods or other bodies of the desired dimensions. These bodies are then sintered in a vacuum or in an argon atmosphere at elevated temperature; this step usually takes approximately two hours.

The process can be carried out in any apparatus known to those skilled in the art. The applicants used a cylindrical reaction chamber of molybdenum metal. The reaction container, after the plutonium metal has been charged into it, is flushed with argon gas to remove all impurities whereby any undesirable reaction with the plutonium metal is prevented.

In the following an example is given for illustrative purposes.

Example

Twenty grams of plutonium metal of high purity were placed into a cylindrical molybdenum reaction chamber and surrounded by a stainless steel cylinder lined with a high-temperature vitreous enamel. Various inlet and outlet tubes connected with an argon source, a hydrogen source, hydrogen sulfide or phosphine reactant and a vacuum source, respectively, were hermetically sealed into the reaction chamber. Likewise, a thermocuple was introduced into the reaction chamber and a vacuum gage was installed in the main pipe line leading into or from the reaction chamber, as the case may be. Two liquid-nitrogen cold traps were arranged to condense hydrogen sulfide and phosphine; by this the reactant could be withdrawn from the reaction chamber and reintroduced by warming up one cold trap and cooling the other with liquid nitrogen; a smooth flow could thus be accomplished without a loss of nonreacted gas. A vacuum of between $5 \times 10^{-3}$ and $15 \times 10^{-3}$ mm. Hg was applied to the reaction chamber for circulation of the reactant.

The reaction chamber containing the plutonium metal was purged with purified argon gas several times, evacuated and then heated to 200° C. At this temperature hydrogen gas was introduced and reacted with the plutonium for about 10 minutes whereupon plutonium hydride of the formula $PuH_3$ was obtained. During this reaction the plutonium hydride did not break up into a powder, as would have been the case with uranium hydride under the same conditions.

The plutonium hydride was allowed to cool to room temperature and removed from the reaction chamber. It was then crushed by mechanical means to a powder of a maximum particle size of 44 microns. The powder was again introduced into the reaction chamber, and purging with argon gas was repeated. The hydride powder was then heated to 400° C. and dehydrided by applying a reduced pressure of 0.025 mm. Hg for eight hours. This step did not bring about complete dehydriding; X-ray diffraction analysis still showed strong lines of the $PuH_2$ phase.

The vacuum was then disconnected, and at the same temperature of 400° C. hydrogen sulfide was introduced, whereby the partly decomposed plutonium hydride was converted to $Pu_2S_3$. The cycle of dehydrating and sulfidization was then repeated twice, using a temperature of 500° C. and 600° C., respectively. The reaction time allowed for the 400° C. cycle was eight hours for the dehydriding step and three hours for the reaction step; a time of six hours was used for each dehydriding step at 500 and 600° C. and of three hours for each reaction step at 500 and 600° C., respectively. Sintering of the plutonium or plutonium compound did not take place when the reaction was carried out in installments as described, but the sulfidization of the plutonium metal was complete after the three cycles.

The experiment was repeated with the same amount of plutonium metal under the same conditions with the exception that phosphine was used as the reactant instead of hydrogen sulfide. In this instance the reaction was carried to completion and plutonium monophosphide was obtained.

Both products, the phosphide-containing mixture and the sulfide-containing mixture, were homogenized in a vacuum of $3 \times 10^{-5}$ mm. Hg for four hours, using a temperature of 1600° C. for the sulfide product and of 1400° C. for the phosphide product. This homogenization treatment was carried out in a tungsten crucible. The sulfide powder obtained was of a yellowish brown color, and the phosphide powder was gray. The sulfide and the phosphide products were analyzed chemically and found to contain about 11.5 w/o of sulfur or phosphorus. Photomicrography showed that both products were of uniform structure.

When a direct reaction of the hydrogen sulfide and of the phosphine gas with plutonium hydride powder was tried over a temperature range of 200 to 600° C., the monosulfide and monophosphide could not be obtained after homogenization.

It will be understood that the invention is not to be limited to the details given herein but that it may be modified within the scope of the appended claims.

What is claimed is:

1. A process of preparing a plutonium compound selected from the group consisting of plutonium monosulphide and plutonium monophosphide comprising reacting plutonium metal with hydrogen at up to 200° C. whereby a plutonium-hydride-containing product is formed; cooling the reaction product; pulverizing the reaction product; heating the reaction product to about 400° C. under reduced pressure whereby partial dehydriding takes place; contacting the partially dehydrided product at about 400° C. with a reactant selected from the group consisting of hydrogen sulfide and phosphine; subjecting the product to at least two more dehydriding-reaction cycles, each subsequent cycle being carried out at a higher temperature than the preceding one, and vacuum heating the product at between 1400 and 1600° C. for homogenization.

2. The process of claim 1 wherein the reactant is hydrogen sulfide and the homogenization temperature is about 1600° C.

3. The process of claim 1 wherein the reactant is phosphine and the homozenization temperature is about 1400° C.

References Cited by the Examiner

AEC Document ANL–6868, Argonne National Laboratory Annual Report for 1963, Metallurgy Division, pp. 139–142.

L. DEWAYNE RUTLEDGE, *Primary Examiner*

BENJAMIN R. PADGETT, *Examiner.*

S. TRAUB, *Assistant Examiner.*